United States Patent [19]

Sleger

[11] Patent Number: 5,021,905
[45] Date of Patent: Jun. 4, 1991

[54] DISK DRIVE ENCLOSURE FOR MINIMIZING STRESSES AND A VIBRATION DAMPING SEAL THEREFOR

[75] Inventor: Roger R. Sleger, Meridian, Id.

[73] Assignee: Hewlett-Packard Company, Palo Alto, Calif.

[21] Appl. No.: 434,653

[22] Filed: Nov. 13, 1989

[51] Int. Cl.⁵ .................. G11B 17/02; G11B 33/14
[52] U.S. Cl. .......................... 360/97.02; 360/97.01
[58] Field of Search .............. 360/97.01, 97.02; 428/344

[56] References Cited

U.S. PATENT DOCUMENTS

| 3,925,584 | 12/1975 | Suzuki et al. | 428/344 X |
| 4,092,687 | 5/1978 | Butsch | 360/97.02 |
| 4,199,646 | 4/1980 | Hori et al. | 428/344 |
| 4,249,221 | 2/1981 | Cox et al. | 360/97.02 |

Primary Examiner—John H. Wolff
Attorney, Agent, or Firm—E. F. Oberheim

[57] ABSTRACT

A disk drive in which the base and the cover are interconnected in spaced positions to provide a marginal, peripheral gap between confronting or adjacent faces or edges thereof. The gap is bridged, closed and sealed by means of a pressure sensitive adhesive tape, a viscoelastic tape, which is energy adsorbing to damp disk drive vibrations.

9 Claims, 2 Drawing Sheets

DISK DRIVE ENCLOSURE FOR MINIMIZING STRESSES AND A VIBRATION DAMPING SEAL THEREFOR

FIELD OF THE INVENTION

This invention relates to the sealing of a hard magnetic disk drive enclosure.

BACKGROUND OF THE INVENTION

Disk drive enclosures are sealed to prevent the entry of contamination that would damage the internal head/disk interface. Hard disk drives are manufactured in clean environments and are sealed prior to moving them into normal user environments. The internal disk parts, such as the disk stack assembly and the moveable actuator which mounts the magnetic heads and which moves the magnetic heads over the surfaces of the disk, are usually assembled onto some form of a base which is part of the main frame of the disk drive. After all of the parts are in place, a protective cover is installed. Thereafter, the cover and the base are sealed to prevent the entry of contaminants into the enclosure.

The magnetic heads inside the disk drives housings must be accurately positioned over data tracks in order to read back data that has previously been written. If drive parts, forming part of the disk stack and the magnetic head suspension assembly, or the main frame, or the cover, change size and/or shape in a changing thermal environment, positional misregistration between the magnetic heads and the pre-written data tracks, can occur which degrade the performance of the disk drive. Disk drive structural parts are manufactured of materials that are elastic and substantially rigid with respect to the application to which they are put. Structural rigidity of the parts is needed to ensure adequate dimensional accuracy and stability. Unfortunately, the inherently poor damping qualities of these elastic parts cause head-to-disk positioning errors when the drive is subjected to vibrational inputs. The disk stack assembly which is rotatably mounted on a fixed spindle is often a significant source of input excitation energy that, combined with the undamped drive structure, is a frequent manufacturing problem.

At the time the disk drive cover is installed, according to conventional practice, the drive is sealed by pressing the cover against a compliant gasket which is often made of an elastomeric material. This gasket is compressed between the cover and the base. This form of sealing poses several problems:

In order for a typical gasket to seal a drive, significant pressure must be applied to the gasket. If this pressure remained constant throughout the life of the disk drive, there would be no resulting drive distortion, and no head-to-disk track misregistration. But in reality, the pressure that is applied by the gasket does not remain constant. The material of the gasket relaxes and the pressure reduces over a period of time and exposure to adverse temperatures. Since the stiffness and dimensions of gaskets also change with temperature, drives also usually develop undesirable head-to-disk mistracking as a function of temperature due to the gasket imposed stress changes which affect the position relationship between the cover and the base.

Gaskets are difficult to clean adequately for use in the disk drive. Structural parts of the drive are usually cleaned in an aggressive solvent that cannot be used on the gasket material. Less effective, alternate cleaning processes usually are required for gaskets. Residual contamination on gaskets can cause damage to the delicate head/disk interface inside a disk drive and reduce the reliability of the disk drive.

Gaskets of this type do not lend themselves to automated assembly processes, so usually they are manually placed into position. Because of this, and inherent defects in the composition and/or surface condition of gaskets and their mating surfaces, the consistency and degree of sealing that is achieved is often unsatisfactory.

DISCLOSURE OF THE INVENTION

Problems of the type encountered in the prior art are overcome in the provision of a disk drive structure in which the cover, when installed, is not pressed against the base. Either the cover or the base or both may have side walls, the ends of which are disposed in confronting, or adjacent, but not touching relationship. In one practical embodiment of this invention, four posts are employed which are mounted at one end of each thereof on the base and which at each of their upper ends receive the top plate of the cover. These posts provide flexibility between the base and the top cover connections. They allow the base and the cover to assume minutely different physical dimensions without imposing any large stresses at the post interfaces. In such an arrangement, the posts are permanently attached to the base and the cover is fastened by screws to the top of each post as well as to the top of the disk spindle and the support for the magnetic head actuator suspension assembly. A disk drive structure in which the top of the disk spindle and the top of the support for the actuator are also attached to the cover which incorporates structural flexibility, and materials having low matched thermal coefficients of expansion for achieving positional predictability, is described in a copending application of the applicant U.S. Ser. No. 07/434,661 filed on the same date as this application, entitled Thermally Predicable Disk Drive Mechanism and assigned to the assignee of this invention.

With the present arrangement, in which the cover and the base do not contact one another, there are no large initial stresses applied to the drive parts tending to permanently displace any of them from the physical relationship among the parts which existed at the time data was recorded on the disks. The drive is sealed by employing a viscoelastic tape seal which does not apply stress to the drive parts. The tape is pressed onto the cover and the base, bridging the gap therebetween in a substantially unstressed condition. Since there are nominally no initial stresses, there are no stress changes over time or temperature. The tape seal is intentionally made of a viscoelastic material which does not generate any significant stress on the drive parts as a result of stiffness changes with changes in temperature, as compressed gaskets do.

By adding a constraining layer (a thin layer of stiff backing material such as aluminum) to the outer face viscoelastic seal material, a high degree of resonant damping is achieved in the overall drive structure. Relative motion between the cover and the base of the drive is damped by the viscoelastic coupling that the seal offers. This added damping greatly reduces the natural ringing of the structure as well as its sensitivity to vibration by sources such as the bearings in rotating disk stack assembly of the disk spindle in the drive.

The tape seal is easily applied. It can be supplied in roll form similar to ordinary pressure sensitive adhesive types of tapes and is dispensed directly against the drive surfaces that are being sealed. There is no need to preclean the tape prior to application to the drive surfaces since the adhesive side of the tape faces the interior of the drive, and any particles that might be present are held adhesively by the sticky viscoelastic material.

Tape seals are easily automated for high volume manufacturing through the use of existing technology that has been developed for the packaging industry. The speed, consistency, and cost of this form of sealing is highly desirable in high volume, low cost disk drive manufacturing.

BEST MODE FOR CARRYING OUT THE INVENTION

Figure 1:
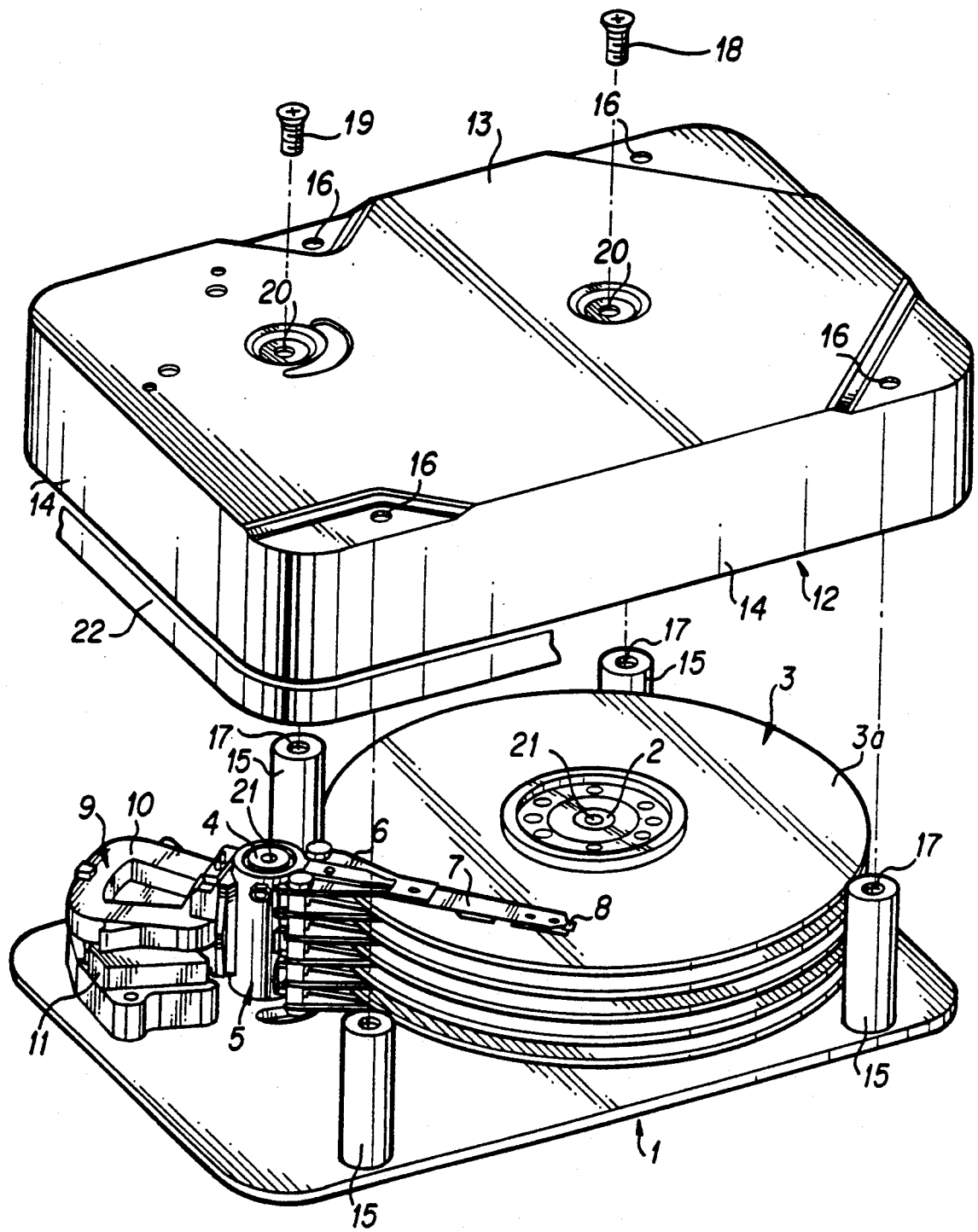
FIG. 1 is an exploded isometric view of a disk drive sealing arrangement embodying the principles of this invention.

FIG. 1 illustrates the best mode for practicing this invention presently known to the applicant. It will be appreciated, however, that this invention is not limited to the specific disk drive which is illustrated.

Referring to the drawing, FIG. 1, the disk drive comprises a base or main frame 1 on which a disk spindle 2 is mounted. The base may be a plate, as shown, or may have sides and ends. A disk stack assembly 3, comprising individual disks 3a, is rotatably journaled on the disk spindle 2. This disk stack assembly is rotated at constant speed by a drive motor which is an integral part of the disk spindle. This invention is applicable to both linear or rotary actuator types of disk drives. The disk drive which is illustrated is of the rotary actuator type. An actuator spindle 4 is secured to the main frame or base 1 adjacent an edge of the disk stack assembly 3. An actuator bearing housing 5 is journaled on the actuator spindle 4 and mounts a plurality of actuator arms 6 each of which, in turn, mounts a flexure 7 each of which flexibly mounts a magnetic head 8 at its extremity. Usually a magnetic head on the bottom arm on the bottom side of the bottom disk, is a dedicated servo positioning head and the dedicated servo disk surface then is the bottom surface of the bottom disk on which the servo code defining the individual tracks is recorded.

An electromagnetic driver generally designated 9 is employed to drive the rotary actuator. The electromagnetic driver 9 comprises a coil 10 secured to the bearing housing 5 and a permanent magnet structure, comprising permanent magnets 11, one of which is illustrated disposed below the coil 10 and another, not illustrated, is positioned above the coil 10. The coil 10 when reversibly energized with direct current moves the actuator arms 6 and the magnetic heads 8 in one direction or another in an arc about the actuator spindle 4, radially over the disk surfaces. In this manner, track seeking is accomplished and track following achieved whenever a selected track is found.

A cover 12, having a top plate 13 and depending sides and ends 14, encloses the disk drive assembly. In FIG. 1, this cover 12 is elevated above the disk drive so that the disk drive components may be visible. In assembled position, the innerface of the top plate 13 of the cover 12 seats upon the upper ends of posts 15 which are secured to the base plate or main frame 1 and which project upwardly therefrom. Holes 16 through the upper plate 13 of the cover 12 are aligned with respective threaded holes 17 in the upper ends of the posts 15. The cover is secured to the upper ends of these posts by means of screws 18, only one of which is shown, which extend through the top plate 13 and individually thread into the adjacent threaded hole 17 in the upper end of each of the posts 15. Additionally, screws 19, only one of which is shown, individually extend through respective holes 20 in the top plate 13 and thread into a threaded hole 21 in the upper end of each of the disk spindle 2 and the rotary actuator spindle 4. By securing the upper ends of the disk spindle 2 and the actuator spindle 4 in the top plate 13 of the cover 2, the upper ends of these spindles are stabilized against the cover 12.

The lengths of the posts 15 and the spindles 2 and 4 are dimensioned with respect to the innerface of the plate 13 so that all confronting face portions thereat make contact, without the need for deformation, when the cover 12 is positioned over the disk drive assembly. In this position the lower peripheral edge of the depending sides and ends 14 of the cover 12, does not touch the peripheral upper face portion of the base of the main frame 1. When the screws 18 and 19 are installed, the assembly is secured.

It is essential that these disk drives be protected against the ingress of contaminants, particularly dust. A final seal between the main frame 1 and the cover 12 is achieved by means of a viscoelastic tape 22, which is only fragmentarily shown in FIG. 1, having a surface coated with a pressure sensitive adhesive which provides a peripheral seal at a gap 1a, FIG. 2, between the cover 12 and the main frame 1. In addition to inhibiting the ingress of contaminants at the gap 1a between the cover 12 and the base or main frame 1, the tape 22 can have a relatively high sheer strength, and provide resistance to relative vibrational movement between the adjacent section.. of the cover 12 and the base 1.

Typically, the seal between the base 1 and the cover 12 of a disk drive, as discussed above, is an elastic gasket that is compressed in the gap between the base 1 and the cover 12. This creates an initial stress in the drive base 1 and cover 12 which is usually present at the time the data tracks are first recorded on the disks of the disk stack. Over a period of time, and especially in the presence of elevated temperatures, the gasket material relaxes and the pressure within the gasket material reduces, also reducing the force that it exerts upon the base 1 and the cover 12. Such force reductions typically cause minute dimensional changes and distortions of the disk drive structural members and significant data head-to-track positioning errors may result. The tape seal solves this problem because it does not impose an initially distorting stress on the base or cover and because of the viscous property of the pressure sensitive adhesive, it also does not impose stress due to aging or due to temperature variations of the disk drive. The tape seal, therefore, in this respect, is a simple, low cost sealing solution that does not cause dimensional distortions within the disk drive over time and temperature.

The tape seal has an additional important function in that it provides a high degree of resonant damping in the overall drive structure. This is achieved, according to one embodiment of this invention, by adding a constraining layer, e.g., a thin layer of stiff backing material such as aluminum, annealed aluminum being preferred, to the viscoelastic seal material, which adds stiffness to the outer face of the tape seal and significant shear energy damping of base-to-cover vibrations. This thin layer is applied to the outer face of the tape, the inner face of which is coated with a pressure sensitive adhesive of a type which has effective damping in the temperature range environment of the disk drive. The use of an aluminum layer or film on the tape is exemplary. Any form of tape whether of single layer or multiple layer, having energy absorbing properties, is contemplated herein.

The use of the tape seal, as compared to the compressed gasket discussed above, permits automation for high volume manufacturing. Once the tape is applied by the simple expedient of rolling the tape around the drive at the gap between the cover and the base plate or by rotating the disk drive against a deflectable, pre-loaded tape seal roll riding against the drive, the tape seal can be applied with the required pressure, or, once applied to the drive, a roller may be pressed against the tape seal around the disk drive to provide the proper sealing pressure.

Figure 2:
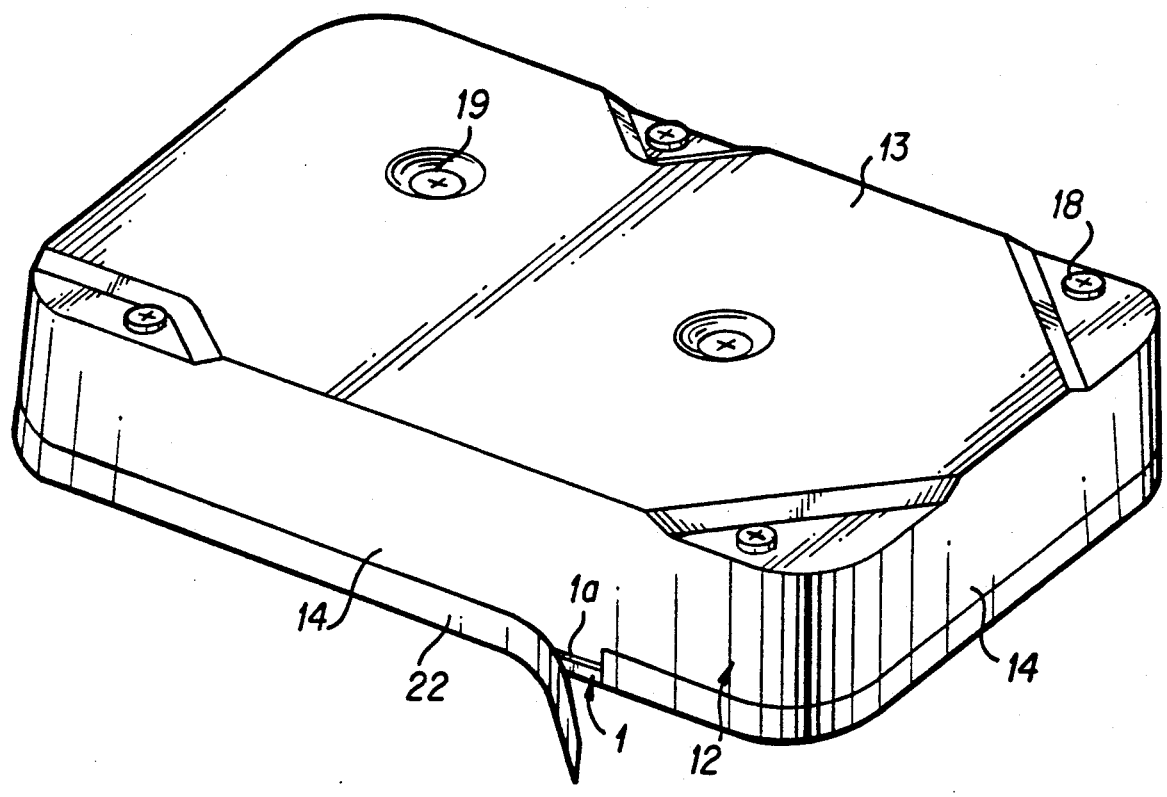
FIG. 2 is an isometric view of a disk drive of the type of FIG. 1, with the cover installed, showing the partial installation of the tape which seals the drive.

While FIGS. 1 and 2 depict a disk drive having a flat base and a cover 12 with depending sides and ends 14, it will be appreciated that other cover/base configurations may be used in which the base itself has the side portions and the cover may be a flat plate or the base and the cover may have side portions which confront and form a gap 1a in a position intermediate the base 1 and the cover top plate 13.

The use of posts 15 in establishing the positional relationship between the cover 12 and the base 1 is exemplary. The use of posts is advantageous in the sense that they provide a degree of flexibility in the structural relationship between the cover 12 and the base 1. Any means for establishing the structural relationship between the cover 12 and the base 1, forming the gap 1a and providing a seal which does not stress the disk drive, may be practiced within the spirit and scope of this invention. In any such installation, however, a degree of flexibility between the cover and the base is desirable to minimize, if not entirely eliminate, the possibility of slippage at the joints or innerfaces among these major parts of the disk drive structure. Additionally, such flexible structural provision and positioning of the major parts, permits the use of tape for the seal, which can damp ringing in the structure.

INDUSTRIAL APPLICABILITY

The disk drive enclosure of this invention is applicable in all types of disk drive.

I claim:

1. A disk drive enclosure in which stresses are minimized, comprising:
   a base having a peripheral portion;
   a cover having a peripheral portion;
   means connecting said cover to said base and supporting said cover spaced from said base in a position defining a gap between said peripheral portion of said base and said peripheral portion of said cover, and
   a viscoelastic material having a pressure sensitive adhesive coating adhesively attached to said base and said cover at each said peripheral portion in a position bridging, closing and sealing said gap.

2. The disk enclosure according to claim 1, in which:
   said means connecting said cover to said base comprises a plurality of flexible structures, each structure being connected at one end to said base and at the other receiving and supporting said cover.

3. The disk drive enclosure according to claim 2, in which: each flexible structure comprises a post.

4. The disk drive enclosure according to claim 2, in which:
   said viscoelastic material having a pressure sensitive adhesive coating is a pressure sensitive adhesive tape which comprises and energy absorbing material for vibration damping.

5. The disk drive enclosure according to claim 4, in which: said energy absorbing material comprises a soft, deformable thin film on said tape.

6. The disk drive enclosure according to claim 5, in which:
   said deformable thin film is aluminum.

7. The disk drive enclosure according to claim 2, in which: said viscoelastic material having a pressure sensitive adhesive coating is a pressure sensitive adhesive tape which comprises and energy absorbing material for vibration damping.

8. The disk drive enclosure according to claim 7, in which: said energy absorbing material comprises a soft, deformable thin film on said tape.

9. The disk drive enclosure according to claim 7, in which: said deformable thin film is aluminum.

* * * * *